United States Patent [19]

Ellett

[11] 4,423,748

[45] Jan. 3, 1984

[54] EMERGENCY SHUT DOWN DEVICE

[75] Inventor: James R. Ellett, Edmonton, Canada

[73] Assignee: Barlorne Resources Limited, Calgary, Canada

[21] Appl. No.: 629,942

[22] Filed: Nov. 7, 1975

[30] Foreign Application Priority Data

Sep. 2, 1975 [CA] Canada ............................... 234571

[51] Int. Cl.³ ...................... F16K 43/00; F16K 37/00; F16K 31/122
[52] U.S. Cl. ...................................... 137/315; 92/5 R; 92/130 A; 92/130 C; 137/556; 251/63.6
[58] Field of Search ................. 92/5 R, 130 A, 130 C; 251/62, 63, 63.5, 63.6, 318, 324, 326, 327, 329; 137/315, 556

[56] References Cited

U.S. PATENT DOCUMENTS

| 3,028,878 | 4/1962 | Natho ................................. 92/5 R |
| 3,086,745 | 4/1963 | Natho ................................ 92/130 C |
| 3,196,618 | 7/1965 | Farmery et al. ....................... 92/5 R |
| 3,209,772 | 10/1965 | Atkinson et al. ................. 92/130 C |
| 3,379,405 | 4/1968 | Natho ................................ 251/63.6 |
| 3,824,901 | 7/1974 | Shafer ............................... 92/130 C |
| 3,858,488 | 1/1975 | Newstead et al. ................ 92/130 A |

FOREIGN PATENT DOCUMENTS 721150 11/1965 Canada ............................. 251/63.6

Primary Examiner—George L. Walton

[57] ABSTRACT

An emergency shut down device for a gate valve utilizes a pre-assembled spring cartridge assembly which includes a container and a compression spring preloaded therein. Suitable openings are provided in the end plates of the cartridge to permit the remaining components, including a ram cup, a piston and cylinder arrangement, a base mounting member and a stem for connection to the valve gate, to be assembled within the cartridge without fear of a spring-initiated explosion of parts as the spring is safely contained within the container before final assembly begins. The device is operable to rapidly close a gate valve when there is a loss of fluid pressure within the device.

6 Claims, 3 Drawing Figures

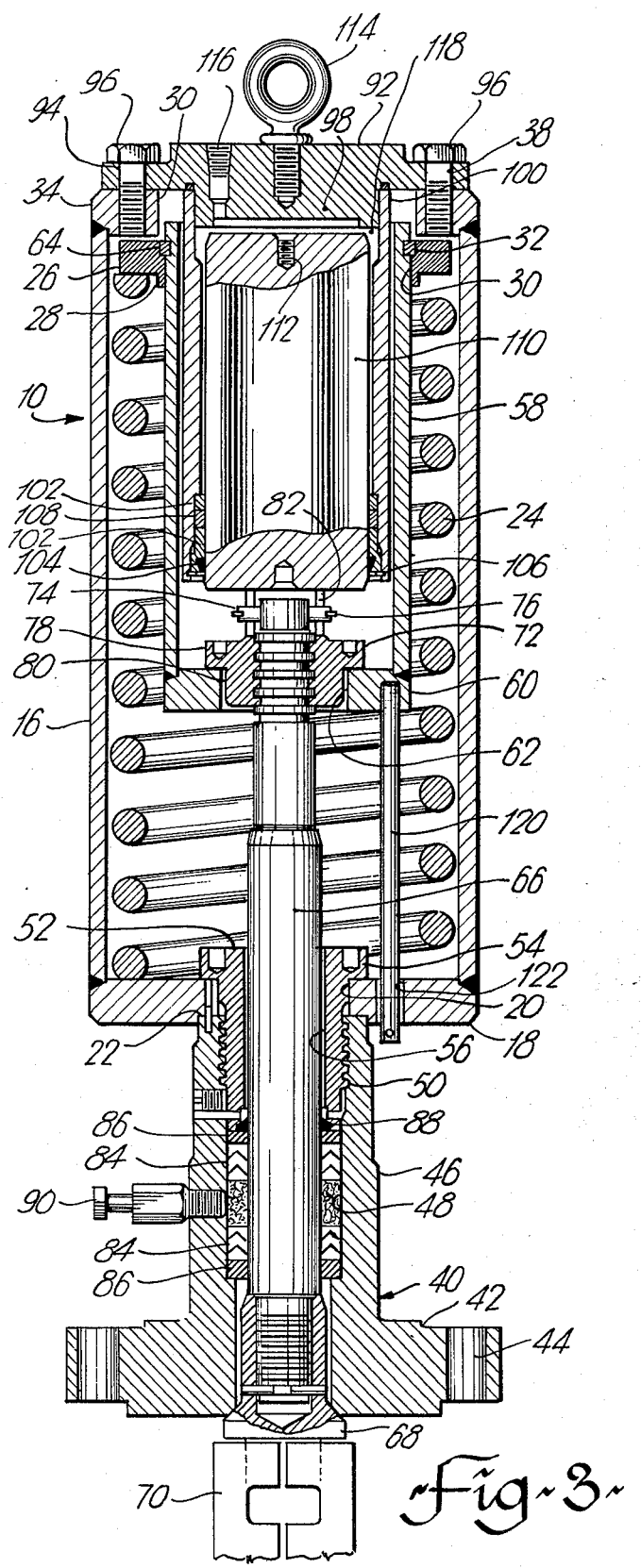

EMERGENCY SHUT DOWN DEVICE

BACKGROUND AND SUMMARY OF THE INVENTION

The present invention relates in general to gate valves and in particular to an emergency shut down device for such valves.

Reciprocating gate valves are well known in the art as are emergency shut down devices therefor, as exemplified in Canadian Pat. Nos. 721,150 (Kongsted, Nov. 9, 1965), 789,403 (Natho, July 9, 1968), and 842,626 (Stehlin, May 26, 1970). Most such devices involve a valve gate reciprocable between positions to open and close the valve by opening or blocking the flow passage. The gate is usually connected via a stem or rod to the shut down device which uses fluid pressure to force the rod in one direction against spring pressure to keep the valve open and uses the spring pressure in the absence of the fluid pressure to force the rod rapidly in the other direction to close the valve.

Because of the number of parts involved in such devices the assembly thereof is often very complex. Complicating the assembly problem is the fact that the spring must be compressed at some stage, often just before all of the components are jammed into the container of the device. This can be an exasperating, and dangerous procedure since an explosion of the parts can easily be initiated by the spring if the assembler is careless. This problem is, of course, compounded in the field where the assembler does not have the benefit of shop conditions and the chances for error are much greater.

The present invention seeks to overcome these problems and to provide a safe, easily assembled (even in the field) emergency shut down device. This is accomplished by pre-assembling the spring into its own container which ultimately forms the main container for the shut down device. With the spring held in a compressed state within the container by the two end plates, access through openings in the plates is still provided to the interior of the container so that the remaining components can be easily assembled with no fear of a spring-initiated explosion. With such a construction repair of the device is extremely easy and safe and hence the cost of repair is substantially reduced.

According to the present invention, therefore, a spring cartridge assembly for use in an emergency valve actuator comprises a generally cylindrical container having first plate means at least partially closing one end and second plate means at least partially closing the other end of the container, the first plate means having a central opening therethrough, the second plate means having a central opening therethrough of larger diameter than the first-mentioned opening, annular ring means within the container and a compression spring positioned between the first plate means and the ring means biasing the ring means towards the second plate means.

An emergency shut down device incorporating the present invention can be defined as an emergency shut down device for a reciprocable valve comprising a base member for connecting the device to a valve housing the member having a central bore therethrough, a spring cartridge assembly including a generally cylindrical container havng first plate means at one end, second plate means at the other end, an opening in the first plate means to receive the base member, an opening in the second plate means of a diameter greater than that of the first-mentioned opening, annular ring means in the container, and compression spring means between the first plate means and the ring means, an annular ram cup connected to and extending from the ring means toward the first plate means, the ram cup having a closure plate provided with a central opening, at the end distant from the ring means and a cap member connected to the exterior of the second plate means to cover the second-mentioned opening, a cylinder connected to and extending from the cap member into the interior of the ram cup, piston means sealingly slidable within the cylinder, stem means connected at one end to the ram cup and extending through the central opening in the ram cup, the interior of the assembly and the bore in the base member for connection to the reciprocable valve, and inlet means in the cap member for admitting fluid under pressure to a chamber formed in the cylinder between the cap member and the piston, whereby fluid under pressure in the chamber will move the piston to abut the ram cup and then move the ram cup to extend the stem means from the base member and to simultaneously compress the spring, a loss of pressure permitting the spring to rapidly return the ram cup, piston and stem to an unextended condition.

BRIEF DESCRIPTION OF THE DRAWINGS

FIG. 3 is a sectional view of an emergency shut down device incorporating the present invention.

DESCRIPTION OF THE PREFERRED EMBODIMENT

Figure 1:
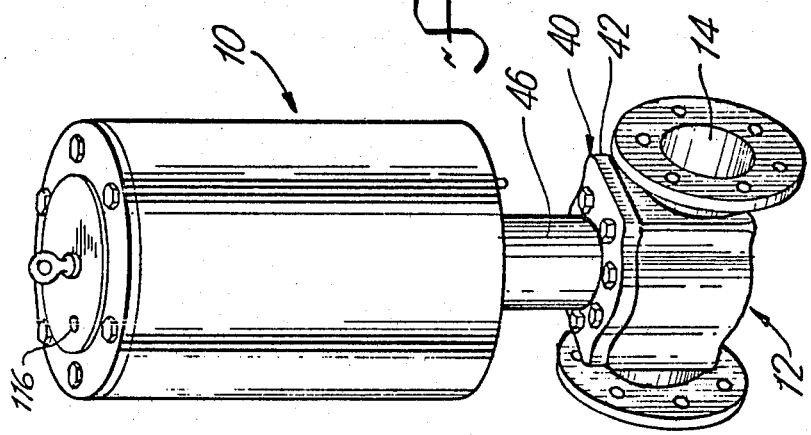
FIG. 1 is a perspective view of the invention in place on a gate valve.

FIG. 1 shows a perspective view of the present invention, identified generally by reference number 10, in place on a gate valve 12. As is well known in the art, a gate valve generally has a fluid passageway 14 which may be opened or closed by a gate member (not shown) which is reciprocable within the body of the valve between two positions whereby the passageway is open or closed to fluid movement. The present invention provides a mechanism for closing the gate member rapidly under emergency conditions and it represents an improvement over other known valve closure actuators.

Figure 2:
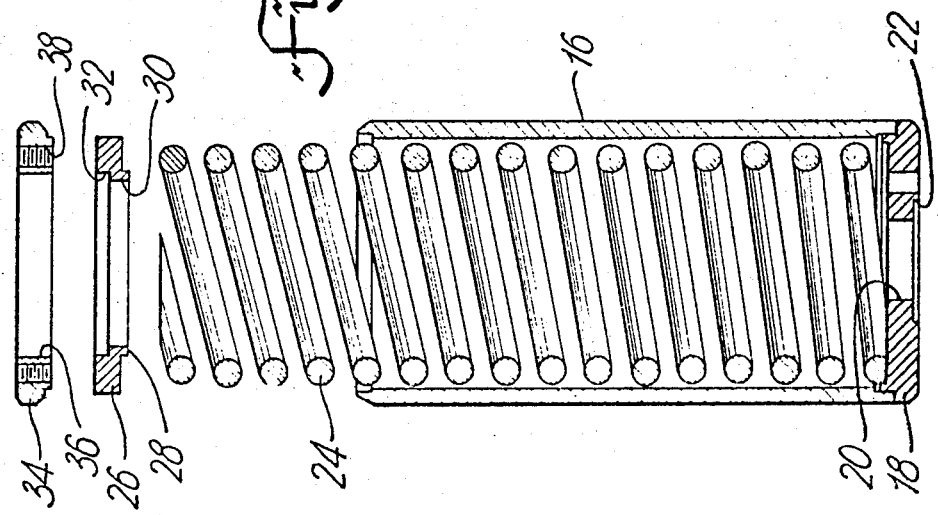
FIG. 2 is an exploded view of the spring cartridge assembly of the present invention.

FIG. 2 shows, in an exploded view, the components which together form a spring cartridge assembly which is at the heart of the present invention. A generally cylindrical container 16 is partially closed at one end by a first plate means 18 which is provided with a central opening 20 therethrough. An annular recess 22 in the outer surface of plate means 18 surrounds opening 20. The first plate means 18 may be secured to the container 16 as by welding.

A compression spring 24 is positioned within the container 16 with one end thereof abutting the first closure plate means 18. Annular ring means 26 is positioned over the free end of the spring 24, ring means 26 having an annular flange 28 extending from one side surface thereof towards closure plate 18. In the other side surface of ring 26 and surrounding the central opening 30 of the ring is an annular recess 32 the purpose of which will become clear hereinafter. Needless to say the outer diameter of the ring 26 is less than the inner diameter of the container 16 and as seen in FIGS. 2 and 3 flange 28 is located within spring 24.

A second plate means in the form of closure plate 34 at least partially closes the other ends of container 16 when the assembly is complete. Plate 34 has a central opening 36 therethrough which is of a diameter greater than that of either opening 20 or opening 30 but less than that of the outer periphery of ring means 26. Also provided in plate means 34 is a plurality of equally spaced threaded holes 38 for mounting further elements thereto.

In assembling the spring cartridge assembly the first plate means 18 would be first of all welded in place and then the spring 24 inserted. Ring means 26 would be placed in the free end of spring 24 and plate means 34 positioned to abut the outer surface of the ring means. Under a compressive force ring means 26 and plate means 34 would compress spring 24 until the plate means 34 came in contact with the free edge of container 16 to which it would be welded. In this way a predetermined spring load can be achieved on a production-line basis and the many hazards associated with this type of equipment could be avoided as there would be very little chance for a spring enhanced explosion of the packaged components when the entire device is dismantled. Also, the remaining components of the device can be assembled within container 16 through access opening 36 in plate means 34. This helps to simplify assembly techniques, especially in the field where there could be a lack of shop equipment needed to assemble the prior art devices.

FIG. 3 shows an emergency shut down device of the present invention in section, the device incorporating the spring cartridge assembly previously described. A base member 40 has a mounting flange portion 42 which is adapted for mounting to the body of a gate valve 12, the flange portion 42 having a plurality of bolt holes 44 for receiving bolts or cap screws to affix the base member to the valve. A trunk portion 46 projects from the flange portion and has a central bore 48 therethrough. At the top of trunk portion 46 the bore 48 expands slightly and has internal threads 50 tapped therein. The outer diameter of the free end of trunk portion 46 coincides with that of recess 22 and is receivable therein. A mounting nut 52 has external threads adjacent the free end thereof to cooperate with threads 50 and the shank of nut 52 is receivable in central opening 20 in closure plate 18. Since nut 52 has annular shoulder means 54 to abut the inside surface of plate 18, the nut can be received in opening 20 and threaded into trunk portion 46 until the plate 18 is securely clamped between shoulder 54 and the free end of the trunk portion 46, thereby securing the base member to the spring cartridge assembly. As is evident from FIG. 3, nut 52 has central bore 56 leading directly into bore 48. It is understood that the assembly of the cartridge assembly to base member 40 is the first step in the assembly of the device and is accomplished through the accessible interior of container 16.

A cylindrical ram cup 58 is closed at one end by a plate member 60 which is provided with a central opening 62 therethrough. The outer diameter of the ram cup is such that there is a close fit of the ram cup through the central opening 30 of ring means 26. In a groove cut in the outer surface of the ram cup adjacent the open end thereof a snap ring 64 is positioned, the ring 64 projecting radially outwardly. Ring 64 is receivable in recess 32 and the cooperation between recess 32, ring 64 and the groove in the ram cup is sufficient to suspend the ram cup 58 from the ring means 26.

A cylindrical stem 66 is then positioned in the device, the stem as is shown in FIG. 3 passing through bores 48, 56 and opening 62. Adjacent the base member 40, means such as gate nut 68 are connected to the stem to attach the stem to the valve gate, represented by number 70. At the opposite end of the stem, means such as stem nut 72 are connected and locked to the stem to provide connection with the ram cup 58. In the illustrated embodiment, nut 72 is threaded to the end of the stem and locked in place by pin 74 which in turn is prevented from falling out by a snap ring 76. Nut 72 is also provided with flange 78 which abuts plate 60, a shank portion 80 located in central opening 62 and a cage portion 82 holding pin 74 and projecting away from shank 80.

Within bore 48 the trunk portion 46 of base member 40 is provided with packing seals 84, gland rings 86, wiper 88 and injection fitting 90 in order to properly guide and lubricate stem 66 in a manner well known in the art.

A cap member 92 has a plurality of holes 94 therethrough alignable with threaded holes 38 so that the cap member can be firmly attached to the plate means 34 as by cap screws 96. A central internal boss 98 on the cap member is externally threaded to receive cylinder means 100, the cylinder means extending outwardly of the cap member and being receivable within ram cup 58. As seen in FIG. 3, the cylinder projects into the ram cup for about 80 percent of the depth of the ram cup or until just above the top of cage 82. The lower interior of cylinder 100 is provided with retainer rings 102, wiper ring 104, snap ring 106 and ram seal 108 as is well known in the art of piston and cylinder arrangements inasmuch as piston means in the form of ram 110 is positioned within cylinder 100. Ram 110 is provided with a threaded bore 112 which can receive a lifting pin or ring (not shown) to aid in positioning the ram in cylinder 100 or in removing it therefrom. In a similar manner, cap member 92 is provided with a lifting ring or eye 114 which can be used in manipulating and maneuvering the entire device.

Cap member 92 also has a threaded bore 116 to receive a suitable fluid pressure-line fitting (not shown) so that pressurized fluid may be introduced into a chamber 118 formed between ram 110 and the cap member and cylinder, the chamber being sealed by elements 102, 104, and 108.

Lastly, an indicator stem 120 is threaded into the underside of the ram cup plate 80 so as to project through an opening 122 in plate means 18.

The emergency shut down device of the present invention is assembled in essentially the order in which the components thereof have been described herein, that is the base member 40 is connected to the spring cartridge assembly; the ram cup is connected to ring means 26; stem 66 is connected to ram cup 58; cylinder 100 is assembled to cap member 92; ram 110 is positioned within cylinder 100; and the cap member with cylinder and ram attached is positioned within ram cup 58 and the cap member is fastened to the spring cartridge assembly.

At the valve, the stem 66 can be connected to the valve gate, the flange portion 42 connected to the valve body or housing and a pressure-line connected to threaded bore 116. With all connections complete the device of the present invention can fulfill its functional obligations.

During normal operation of the illustrated embodiment, fluid under pressure will be forced into chamber 118 to drive ram 110 downwardly (as in FIG. 3) and outwardly of cylinder 100. The ram contacts cage 82 and durings its continued outward movement it will force the stem (and the valve gate) downwardly, simultaneously compressing spring 24 through downward movement of ram cup 58, until there is a balance of the pressure and spring forces, at which point the valve should be open. Should an emergency occur, the emergency annunciating device would ensure that the pressurized fluid was bled from chamber 118 whereupon the spring forces would take over to drive ram cup 58 and hence stem 66 (and the valve gate) and ram 110 upwardly thereby closing the valve by positioning the valve gate across passageway 14.

When normal operation is underway, with the valve open, indicator stem 120 will project a considerable length below plate 18 to thereby indicate that there are no problems. The absence of stem 120 below plate 18 will indicate that the valve is closed.

It is understood that the above description relates to but a single mode of putting the present invention into effect. Various changes could be made to the invention without departing from the spirit thereof: for example plate means 18 could be formed integrally with container 16; or container 16 could be turned end for end and other components suitably modified so that stem 66 projected out through cap member 92, the stem being attached to ram 110 so that movement of the ram would draw the valve gate towards container 16 while simultaneously compressing spring 24 through interaction with ram cup 58. Other structural variations would undoubtedly occur to a skilled practitioner and hence the scope of the present invention should be determined by the claims appended hereto.

I claim:

1. An emergency shut down device for a reciprocable valve comprising:
   (a) a base member for connecting said device to a valve housing, said member having a central bore therethrough;
   (b) a spring cartridge assembly including a generally cylindrical container having first plate means at one end, second plate means at the other end, an opening in said first plate means to receive said base member, an opening in said second plate means of a diameter greater than that of the first-mentioned opening, annular ring means in said container, and compression spring means between said first plate means and said ring means;
   (c) an annular ram cup connected to and extending from said ring means toward said first plate means, said ram cup having a closure plate provided with a central opening, at the end distant from said ring means;
   (d) a cap member connected to the exterior of said second plate means to cover the second-mentioned opening;
   (e) a cylinder connected to and extending from said cap member into the interior of said ram cup;
   (f) piston means sealingly slidable within said cylinder;
   (g) stem means connected at one end to said ram cup and extending through the central opening in said ram cup, the interior of said assembly and said bore in said base member for connection to said reciprocable valve; and
   (h) inlet means in said cap member for admitting fluid under pressure to a chamber formed in said cylinder between said cap member and said piston, whereby fluid under pressure in said chamber will move said piston to abut said ram cup and then move said ram cup to extend the stem means from the base member and to simultaneously compress the spring, a loss of pressure permitting the spring to rapidly return the ram cup, piston and stem to an unextended condition.

2. The device of claim 1 and including an indicator stem extending from said ram cup through one of said first or second plate means, the degree of extension of said indicator stem from said container being indicative of the position of said ram cup within said container.

3. The device of claim 1 and including means in said base member for lubricating, guiding and sealing said stem in said bore.

4. The device of claim 1 wherein said ring means includes an annular flange extending from one side thereof towards said first plate means, said ram cup being removably received in said annular flange and being connected to said ring means adjacent said flange.

5. The device in claim 4 wherein said ram cup is connected to said ring means by way of an annular, outwardly projecting flange on said ram cup, received in a corresponding annular recess in said ring means on the side thereof opposite said flange.

6. The device of claim 1 wherein said opening in said second plate means is larger in diameter than the central passage in said ring means whereby upon removing said cap member, said cylinder, piston, ram cup and stem can be removed from said spring cartridge assembly.

* * * * *